United States Patent
Van Wiemeersch et al.

(10) Patent No.: US 9,493,085 B2
(45) Date of Patent: *Nov. 15, 2016

(54) VEHICULAR CHARGING AND PROTECTION SYSTEMS

(71) Applicant: Ford Global Technologies, LLC, Dearborn, MI (US)

(72) Inventors: John Robert Van Wiemeersch, Novi, MI (US); Richard William Kautz, North Branch, MI (US); Cornel Lewis Gardner, Romulus, MI (US); Stuart C. Salter, White Lake, MI (US); Eric L. Reed, Livonia, MI (US); Don David Price, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/793,227

(22) Filed: Jul. 7, 2015

(65) Prior Publication Data

US 2015/0306963 A1    Oct. 29, 2015

Related U.S. Application Data

(63) Continuation of application No. 13/894,505, filed on May 15, 2013, now Pat. No. 9,145,110, which is a continuation-in-part of application No. 13/282,933, filed on Oct. 27, 2011, now abandoned, and a (Continued)

(51) Int. Cl.
*H02J 7/00* (2006.01)
*B60L 11/18* (2006.01)

(Continued)

(52) U.S. Cl.
CPC ............. *B60L 11/182* (2013.01); *B60L 7/14* (2013.01); *B60L 11/14* (2013.01); *B60L 11/1816* (2013.01);

(Continued)

(58) Field of Classification Search
CPC ........................................... H02J 7/025
USPC .................................................. 320/108
See application file for complete search history.

(56) References Cited

U.S. PATENT DOCUMENTS

| | | |
|---|---|---|
| 3,634,844 A | 1/1972 | King |
| 4,091,371 A | 5/1978 | Mason, Jr. et al. |

(Continued)

FOREIGN PATENT DOCUMENTS

| | | |
|---|---|---|
| JP | 2007138837 A | 6/2007 |
| WO | 0061265 | 10/2000 |

OTHER PUBLICATIONS

AOL Auto Staff, posted Feb. 15, 2013, "Rabbits Attacking Cars Parked at Denver International Airport," http://autos.aol.com/article/rabbits-attacking-cars-parked-at-denver-international-airport/.

(Continued)

*Primary Examiner* — Edward Tso
*Assistant Examiner* — Ahmed Omar
(74) *Attorney, Agent, or Firm* — Frank MacKenzie; Price Heneveld LLP

(57) ABSTRACT

A charging system for a vehicle. The charging system includes an on-board battery, a charger region and a wireless receiver for generating a charging signal in the charger region to charge a battery. The system also includes a plurality of sensors located to sense living beings and foreign objects in proximity to the charger region. The system further includes a controller for filtering transient conditions and terminating the charging signal when a being or a foreign object is near the charger region.

17 Claims, 9 Drawing Sheets

Related U.S. Application Data continuation-in-part of application No. 13/726,441, filed on Dec. 24, 2012, now Pat. No. 9,227,594, and a continuation-in-part of application No. 13/726,436, filed on Dec. 24, 2012, now Pat. No. 9,030,301.

(51) Int. Cl.

| | | |
|---|---|---|
| *B60R 25/10* | (2013.01) | |
| *H02J 7/02* | (2016.01) | |
| *B60L 7/14* | (2006.01) | |
| *B60L 11/14* | (2006.01) | |

(52) U.S. Cl.
CPC ........ *B60L 11/1833* (2013.01); *B60L 11/1835* (2013.01); *B60L 11/1864* (2013.01); *B60L 11/1877* (2013.01); *B60R 25/1004* (2013.01); *H02J 7/025* (2013.01); *B60L 2210/40* (2013.01); *B60L 2240/662* (2013.01); *B60L 2250/10* (2013.01); *B60L 2270/145* (2013.01); *B60L 2270/147* (2013.01); *H02J 7/0029* (2013.01); *Y02T 10/70* (2013.01); *Y02T 10/7005* (2013.01); *Y02T 10/7061* (2013.01); *Y02T 10/7072* (2013.01); *Y02T 10/7077* (2013.01); *Y02T 10/7241* (2013.01); *Y02T 10/7291* (2013.01); *Y02T 90/121* (2013.01); *Y02T 90/122* (2013.01); *Y02T 90/125* (2013.01); *Y02T 90/127* (2013.01); *Y02T 90/14* (2013.01); *Y02T 90/16* (2013.01)

(56) References Cited

U.S. PATENT DOCUMENTS

| | | | |
|---|---|---|---|
| 4,168,495 A | 9/1979 | Sweeney | |
| 4,176,348 A | 11/1979 | Tobin et al. | |
| 4,325,058 A | 4/1982 | Wagner et al. | |
| 4,361,827 A | 11/1982 | Geller | |
| 4,580,062 A | 4/1986 | MacLaughlin | |
| 4,621,258 A | 11/1986 | Campman | |
| 4,690,240 A | 9/1987 | Russo | |
| 4,987,402 A | 1/1991 | Nykerk | |
| 5,117,217 A | 5/1992 | Nykerk | |
| 5,164,706 A | 11/1992 | Chen | |
| 5,298,884 A | 3/1994 | Gilmore et al. | |
| 5,315,285 A | 5/1994 | Nykerk | |
| 5,612,878 A | 3/1997 | Joao et al. | |
| 5,712,623 A | 1/1998 | Kumai et al. | |
| 5,764,145 A | 6/1998 | Hansson et al. | |
| 5,839,081 A | 11/1998 | Joao et al. | |
| 6,014,602 A | 1/2000 | Kithil et al. | |
| 6,075,294 A | 6/2000 | Van den Boom et al. | |
| 6,420,971 B1 | 7/2002 | Leck et al. | |
| 6,441,733 B1 | 8/2002 | Unterschultz | |
| 6,446,012 B1 | 9/2002 | Macke, Sr. et al. | |
| 6,739,311 B1 | 5/2004 | Kingsley | |
| 7,098,675 B2 | 8/2006 | Inaba et al. | |
| 7,239,238 B2 | 7/2007 | Tester et al. | |
| 7,612,528 B2 * | 11/2009 | Baarman | H01F 5/02 307/9.1 |
| 8,002,232 B2 | 8/2011 | Meislahn | |
| 8,102,147 B2 * | 1/2012 | Jung | H02J 7/025 320/108 |
| 8,963,699 B2 * | 2/2015 | Potter | B60R 25/20 248/551 |
| 2001/0048313 A1 | 12/2001 | Frank | |
| 2007/0182538 A1 * | 8/2007 | Ota | B60R 25/1004 340/506 |
| 2007/0251061 A1 | 11/2007 | Heiselbetz | |
| 2010/0117596 A1 * | 5/2010 | Cook | B60L 11/182 320/108 |
| 2010/0258703 A1 | 10/2010 | Meislahn | |
| 2011/0036130 A1 | 2/2011 | Hisler | |
| 2011/0057606 A1 * | 3/2011 | Saunamaki | H02J 7/025 320/108 |
| 2011/0181387 A1 * | 7/2011 | Popelard | B60R 25/246 340/5.2 |
| 2011/0253471 A1 | 10/2011 | Dusa, II | |
| 2011/0254654 A1 | 10/2011 | Lo et al. | |
| 2012/0126745 A1 | 5/2012 | Partovi et al. | |
| 2012/0153731 A9 | 6/2012 | Kirby et al. | |
| 2012/0235636 A1 * | 9/2012 | Partovi | H02J 7/025 320/108 |
| 2013/0249682 A1 | 9/2013 | Van Wiemeersch et al. | |
| 2013/0300550 A1 | 11/2013 | Potter | |
| 2014/0176320 A1 | 6/2014 | Reed et al. | |

OTHER PUBLICATIONS

Nationwide, printed Dec. 24, 2012, "Business Alert: Catalytic Converter Theft," http://www.nationwide.com/catalytic-converter-theft.jsp.

edmunds.com, printed Dec. 24, 2012, "In Under Two Minutes: Catalytic Converter Theft," http://www.edmunds.com/auto-insurance/in-under-two-minutes-catalytic-converter-theft . . . .

AA1CAR, Catalytic Converter, http://www.aa1car.com, last accessed Mar. 21, 2011, 6 pages, http:www.aa1car.com/library/converter.htm.

Wikipedia, Catalytic Converter, http://en.wikipedia.org, last accessed Mar. 21, 2011, 10 pages, http://en.wikipedia.org/wiki/Catalytic-converter.

Atmel, revised 2009, "Touch Sensors Design Guide," 10620 D-AT42-04/09, 72 pages, Copyright 2008-2009 Atmel Corporation.

\* cited by examiner

VEHICULAR CHARGING AND PROTECTION SYSTEMS

CROSS-REFERENCE TO RELATED APPLICATIONS

This application is a continuation of U.S. patent application Ser. No. 13/894,505, filed on May 15, 2013, entitled "VEHICLE WIRELESS CHARGER SAFETY SYSTEM", now issued as U.S. Pat. No. 9,145,110, which is: a continuation-in-part of U.S. patent application Ser. No. 13/282,933, filed on Oct. 27, 2011, entitled "WIRELESS CHARGING SYSTEM HAVING SENSE SHUTDOWN AND METHOD THEREFOR," now abandoned; a continuation-in-part of U.S. patent application Ser. No. 13/726,441, filed Dec. 24, 2012, entitled "RESISTANCE-BASED CATALYTIC CONVERTER PROTECTION SYSTEMS AND CONFIGURATIONS," now issued as U.S. Pat. No. 9,227,594; and also a continuation-in-part of U.S. patent application Ser. No. 13/726,436, filed Dec. 24, 2012, now U.S. Pat. No. 9,030,301, entitled "CAPACITANCE-BASED CATALYTIC CONVERTER PROTECTION SYSTEMS AND CONFIGURATIONS." The aforementioned related applications are hereby incorporated by reference in their entirety.

FIELD OF THE INVENTION

The present invention generally relates to wireless vehicle charging systems and, more particularly, relates to reducing exposure to foreign objects and living beings in proximity to such systems from the electric signal generated by the charging systems.

BACKGROUND OF THE INVENTION

Battery operated electronic devices, such as cell phones, employ rechargeable batteries that must be recharged when the battery charge is depleted. Electric and hybrid vehicles also employ rechargeable batteries in their drive systems that must be recharged when the battery charge is depleted. Typically, electric-powered or electronic devices are physically connected to an electrical charger via a wire connection. The batteries employed in hybrid and electric vehicles are also typically connected to a charger via a wire connection. More recently, wireless charging devices, such as inductive chargers, have been developed to charge these batteries without any physical wire connection between the electronic receiver device or vehicle and the transmitter charging device.

Wireless chargers generate an electrical signal in the form of an electromagnetic field through the use of electromagnetic transducers to transfer the electric energy from the charging device to the battery or device having a battery being charged. Inductive chargers generate an electrical signal in the form of a magnetic field through the use of inductive coils to transfer the electric energy from the charging device to the battery in the device or vehicle having a battery being charged. Inductive chargers have been proposed for use in vehicles at various locations within the cockpit of the vehicle having a battery, typically near the driver and other passengers for the sake of convenience to allow easy access to the devices. Inductive chargers have also been proposed for use in charging batteries employed in the drive systems of hybrid and electric vehicles (e.g., battery electric vehicles (BEVs) and plug-in hybrid electric vehicles (PHEVs)).

The electromagnetic fields (EMF) generated by such inductive chargers may overlap with an occupant, pedestrian and/or foreign objects within or in proximity to the vehicle. The EMF associated with charging a battery used in the drive system of a hybrid or electric vehicle can be particularly high in energy. It is therefore desirable to provide a wireless charger within a vehicle, and wireless charging systems used with batteries employed in the drive system of electric and hybrid vehicles, in a safe manner. For example, it would be advantageous to minimize the exposure of electromagnetic fields to a user such as a driver and other passengers in the vehicle, and/or foreign objects or pedestrians in proximity to such chargers and systems.

Over the past decade, a rise in the cost of precious metals (e.g., platinum, palladium, rhodium and gold) has spurred an increase in thefts of catalytic converters used in vehicles. The catalytic converters used in most automobiles contain precious metals. Thieves have been known to physically remove catalytic converters from the underside of parked vehicles. The threat to vehicle dealerships is acute, as many dealerships possess hundreds of vehicles parked in showrooms and outdoor lots. Trucks, vans and SUVs are particularly vulnerable to catalytic converter theft as these vehicles sit high off of the ground. The replacement cost for a catalytic converter can exceed $1000, not including the costs associated with inoperability of the vehicle until repair.

Known approaches to deterring and/or preventing the theft of catalytic converters rely on devices and components that mechanically secure the converter to the vehicle. These devices and components may consist of a series of cables, clamps and the like designed to attach the converter to the vehicle in a configuration that cannot be readily removed by a would-be thief. These components and devices are fairly expensive and may approach $300, up to a third of the replacement cost of the catalytic converter. In addition, these mechanically-oriented catalytic converter theft deterrent and preventions systems can add appreciable weight to the vehicle with an adverse effect on fuel efficiency. Even if the thief or other would-be criminal is deterred from tampering with and/or stealing the catalytic converters afforded protection by these mechanical devices, these individuals may still inflict significant damage to the vehicle before being deterred. It is therefore desirable to provide catalytic converter protection systems that can deter would-be criminals from damaging and/or stealing these catalytic converter systems in the first instance, before such damage has been inflicted to the systems.

SUMMARY OF THE INVENTION

According to one aspect of the present invention, a charging system for a vehicle is provided. The charging system includes an on-board battery, a charger region and a wireless receiver for generating a charging signal in the charger region to charge a battery. The system also includes a plurality of sensors located to sense living beings and foreign objects in proximity to the charger region. The system further includes a controller for filtering transient conditions and terminating the charging signal when a being or a foreign object is near the charger region.

According to another aspect of the present invention, a vehicular protection system is provided. The vehicular protection system includes a battery, a catalytic converter and a receiver that generates a charging signal in a charger region to charge the battery. The system also includes a plurality of sensors located to sense living beings near the charger region and the converter. The system further includes a controller coupled to the sensors for filtering transient conditions, terminating the charging signal when a being is near the charger region and activating an alarm when a being is near the converter.

Another aspect of the present invention is to provide a charging system for a vehicle. The charging system includes an on-board battery, a charger region and an on-board wireless receiver that generates a charging signal in the charger region to charge the battery. The system also includes a controller coupled to a plurality of sensors, both arranged to evaluate living beings and foreign objects in proximity to the charger region and filter transient conditions.

These and other aspects, objects, and features of the present invention will be understood and appreciated by those skilled in the art upon studying the following specification, claims, and appended drawings.

DETAILED DESCRIPTION OF THE PREFERRED EMBODIMENTS

As required, detailed embodiments of the present invention are disclosed herein; however, it is to be understood that the disclosed embodiments are merely exemplary of the invention that may be embodied in various and alternative forms. The figures are not necessarily to a detailed design; some schematics may be exaggerated or minimized to show function overview. Therefore, specific structural and functional details disclosed herein are not to be interpreted as limiting, but merely as a representative basis for teaching one skilled in the art to variously employ the present invention.

Figure 1:
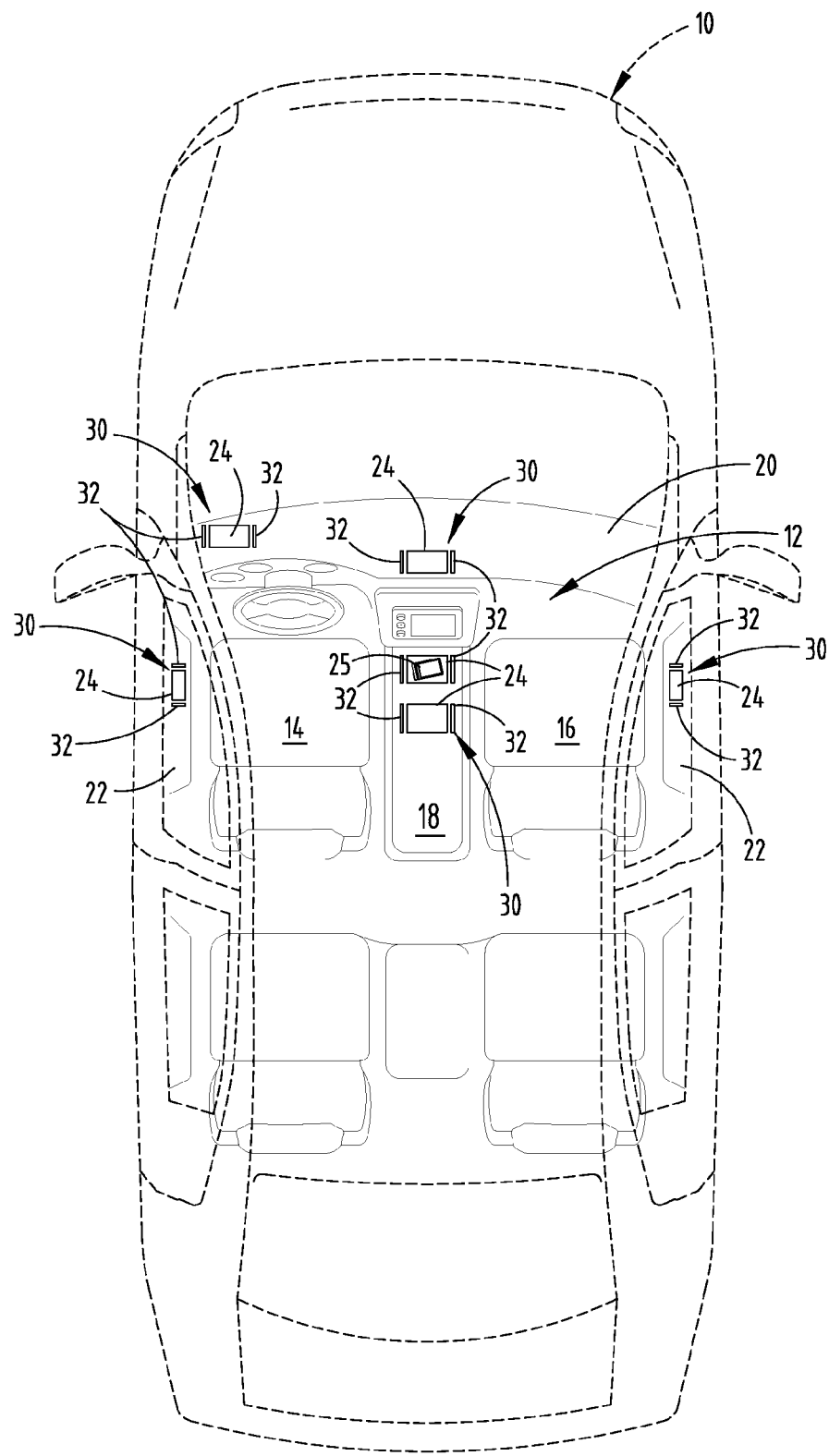
FIG. 1 is a perspective view of a cockpit of a vehicle employing a wireless charger at various potential locations, according to several embodiments.
Figure 2:
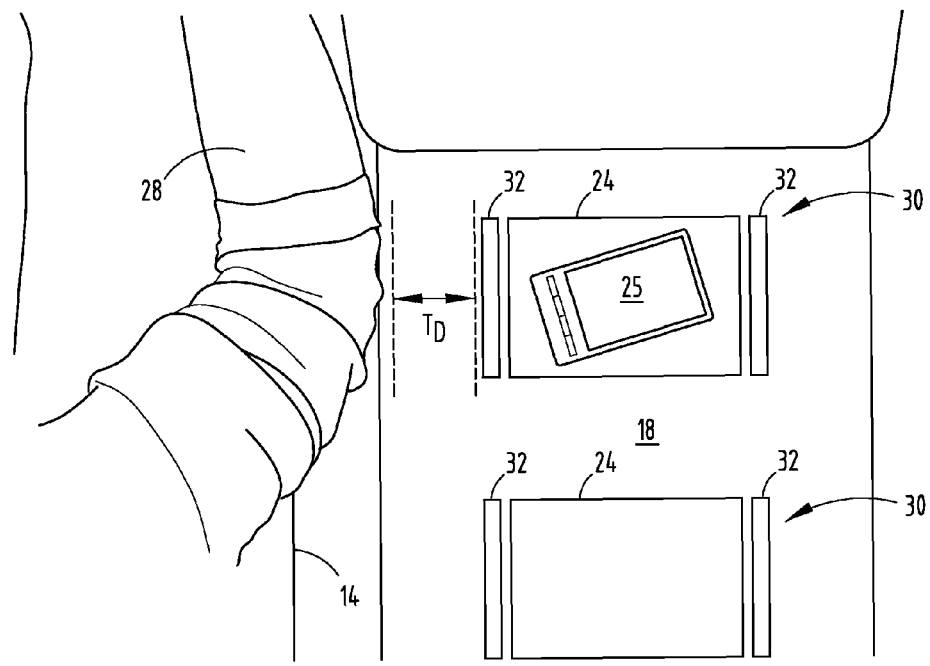
FIG. 2 is an enlarged view of a portion of the vehicle cockpit further illustrating a charging system employing proximity sensing and control to reduce electromagnetic field exposure to occupants in the vehicle, according to one embodiment.
Figure 3:
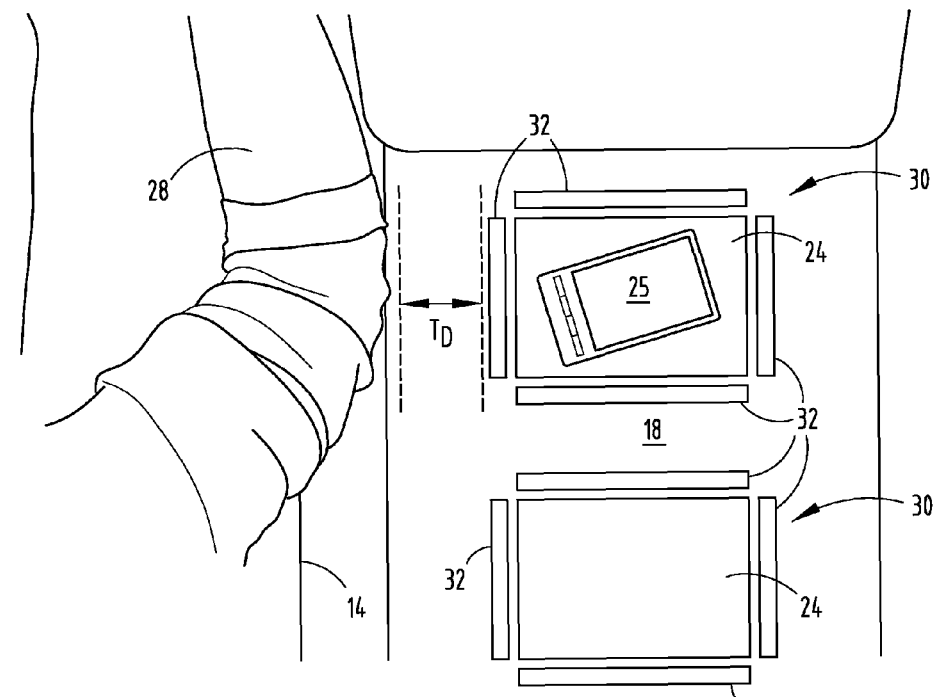
FIG. 3 is an enlarged view of a portion of the vehicle cockpit further illustrating a charging system employing proximity sensing surrounding the wireless charger, according to another embodiment.

Referring to FIGS. 1-3, the interior of an automotive vehicle 10 is generally illustrated having a passenger compartment 12 employing various embodiments of a wireless charging system 30. The vehicle 10 generally includes a seating arrangement including a front driver seat 14 and front passenger seat 16, each adapted to seat a person as an occupant in passenger compartment 12 of the vehicle 10. The vehicle 10 also includes a center console 18 disposed between front seats 14 and 16, a dashboard 20 generally forward of the seats 14 and 16, and side door armrests 22 adjacent to each of seats 14 and 16. The center console 18, dashboard 20, and armrests 22, as well as other vehicle assemblies, may be equipped with various device holders such as trays and storage compartments that may receive one or more devices for wireless charging. The vehicle 10 may further include rear seating and wireless charging trays and storage compartments located in the rear seating area.

The vehicle 10 may be equipped with one or more wireless charging systems 30 for wirelessly charging one or more devices, including one or more rechargeable batteries providing electrical power within an electronic device. In one embodiment, one or more wireless charging systems 30 may be provided in storage trays or dedicated trays provided in the center console 18. The wireless charging system 30 includes a wireless charger, such as an inductive charger according to one embodiment. Inductive chargers typically include one or more inductive coils for generating electric signals in the form of an electromagnetic field (EMF) typically at low frequencies within a charging region 24. In the embodiment shown, the charging region 24 may be defined by a tray or a storage compartment for receiving a device, such that the device when located within the charging region 24 may be charged via the electromagnetic field through inductive coupling. According to another embodiment, the wireless charging system 30 may use a charging region 24 provided on one or more pads or trays provided in the vehicle dashboard 20. According to a further embodiment, the wireless charging system 30 may use a charging region 24 provided with an inductive charger (not shown) located in a tray within the armrest 22 extending from a vehicle door. In each of these embodiments, the wireless charging system 30 has a charging region 24 adapted to receive one or more devices, such as rechargeable batteries or electric powered or electronic devices 25 employing rechargeable batteries that may be charged via an electric signal on the charging region and may be accessible to the driver or other passengers within the passenger compartment 12 of vehicle 10. Examples of electronic devices 25 that may be charged by the charging system 30 include cell phones, tablet computers, video games, cameras, radios, lighting devices, and music and video players.

The vehicle charging system 30 includes one or more wireless chargers for generating electric charging signals in a charger region 24 to charge a device, such as a rechargeable battery or an electronic device containing a rechargeable battery. The wireless charger may include an inductive charger generating an electromagnetic field. The inductive charger may include one or more inductive coils located below or on the bottom surface of the charger region 24 such as a pad for generating an electromagnetic field in the charger region 24. The electromagnetic field passes into the charger region 24 and is intended to couple to one or more inductive coils provided in the device 25 so as to transfer electrical energy thereto for purposes of charging one or more rechargeable batteries. As a result, an electromagnetic field is present within the charger region 24. When an occupant seated within the vehicle is in close proximity to the wireless charging system, particularly the charger region 24, it may be desirable to prevent the transmission of the electromagnetic field into the user's body. The wireless charging system 30 employs one or more proximity sensors 32 located proximate to the charger region 24 to sense presence of an object, such as a body part of a person in close relation or proximity to the charger region 24 and reduces the charging signal when an object is sensed.

The proximity sensing may include one or more proximity sensors 32 located on at least one side of the charger region as shown in FIG. 2. First and second proximity sensors 32 are shown, with the first proximity sensor 32 located between the charger region 24 within a tray and vehicle seat 14, and the other proximity sensor 32 located between the opposite side of the charger region 24 and the opposite side seat 16. According to another embodiment, the charger region 24 may be substantially surrounded by one or more proximity sensors 32 as shown in FIG. 3. In the embodiment shown, four separate proximity sensors 32 may be arranged around the perimeter of the charger region 24. According to another embodiment, a single proximity sensor 32 may be formed to surround the charger region 24. In further embodiments, the one or more proximity sensors 32 may be located below the charger region 24 or in a lid above the charger region 24 or at other locations suitable to detect an object in close proximity to the charger region 24.

The proximity sensor 32 may be a capacitive sensor, according to one embodiment. The proximity sensor 32 provides a sense activation field to sense contact or close proximity of a user in relation to the one or more proximity sensors, such as the presence of an object 28, such as a user's arm, leg or finger. In this embodiment, the sense activation field of each proximity sensor 32 is a capacitive field and the user's body part has electrical conductivity and dielectric properties that cause a change or disturbance in the sense activation field, as should be evident to those skilled in the art. However, it should be appreciated by those skilled in the art that additional or alternative types of proximity sensors can be employed to sense an object in close proximity to the charging region 24, such as, but not limited to, inductive sensors, optical sensors, temperature sensors, resistive sensors, ultrasonic sensors, lasers, field effect sensors, the like, or a combination thereof. Exemplary proximity sensors are described in the Apr. 9, 2009 ATMEL® Touch Sensors Design Guide, 10620 D-AT42-04/09, the entire reference hereby being incorporated herein by reference.

The proximity sensors 32 may be configured to provide an adjustable range shown by distance threshold $T_D$ in which to sense an object. As seen in FIG. 2, the adjustable range may be adjusted by changing the threshold distance $T_D$. According to one example, a distance threshold $T_D$ may be adjusted to sense objects in a range adjustable between 2 and 12 centimeters. This may be achieved by adjusting the burst length of one or more capacitive sensors using software so as to tune the distance of the proximity sensor sense activation field relative to the charger region 24. Thus, the wireless charging system 30 may have adjustable proximity sensing to accommodate a wide variety of vehicle and charger configurations and users. Additionally, it should be appreciated that the charging may be reduced or suspended in the event that use of the device is detected, such as use of a keyboard on a phone.

The proximity sensors 32 may sense that an object is in close proximity to the charger region when the object is either detected within the charger region or within a distance of twelve centimeters (12 cm), according to one embodiment. In one embodiment, the wireless charging system controls the wireless charger to at least reduce the electric charging signal when an object is sensed by the proximity sensor. According to another embodiment, the wireless charging system prohibits or turns off the electric charging when an object is sensed in close proximity to the charging region. According to further embodiments, the wireless charging system may initially reduce the electric charging signal when an object is sensed at a first distance, such as 12 centimeters from the charger region, and may further reduce or turn off the electric charging signal when the object is detected at a second closer distance such as 2 centimeters from the charger region. The electric signal power may be thereby reduced to a level that still maintains charging of the device and suspends charging if a person places a body part very close or directly in the charging region 24.

The proximity sensor 32 may include a capacitive sensor having a fixed switching frequency or a dynamic switching frequency. With the dynamic switching frequency, frequencies which may overlap or fall in the same frequency band as the charging signal frequency may avoid interference therewith by changing the frequency. Additionally, capacitive switching circuits may be employed that mask out those frequencies used by the charger or the charger may mask out frequencies used by the proximity sensor to avoid interference.

Figure 4:
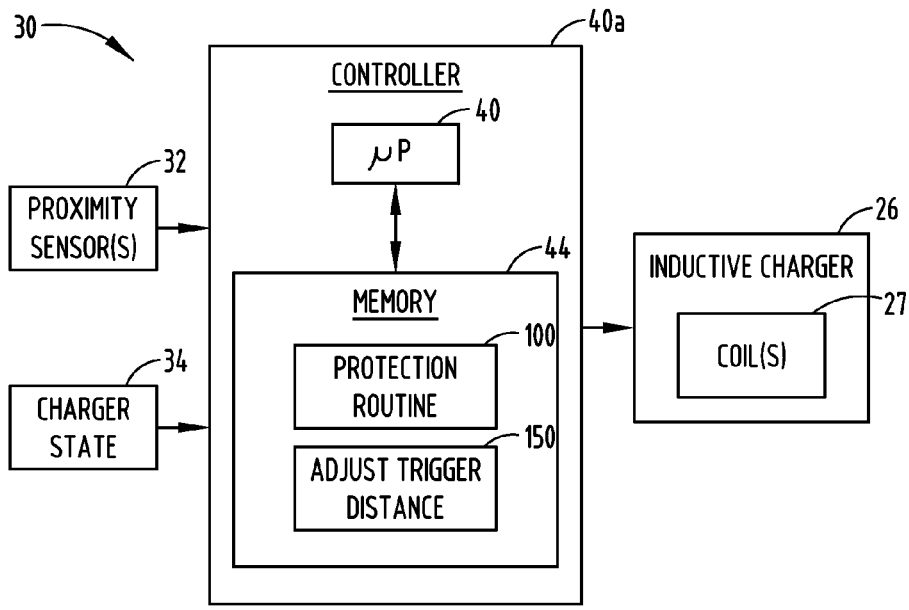
FIG. 4 is a block diagram of the inductive charging system, according to one embodiment.

Referring to FIG. 4, the wireless charging system 30 is further illustrated having control circuitry shown in one embodiment as a controller 40a including a microprocessor 40 and memory 44. The controller 40a may include other or additional analog and/or digital circuitry. Stored within memory 44 is a protection routine 100 and adjustable trigger distance parameters 150. The controller 40a receives as inputs the output of the proximity sensor(s) 32 and a signal indicative of the current charger state 30, e.g., on or off. Controller 40a processes the inputs with respect to the protection routine 100 and generates an output to the inductive charger 26 having inductive coil(s) 27 so as to at least reduce or prohibit the electrical charging signal to be generated by the charger 26 within the charging region when an object is sensed by the proximity sensor(s). The sensing range of the proximity sensor(s) 32 may be adjusted by selecting an adjust trigger distance parameter 150.

Figure 5:
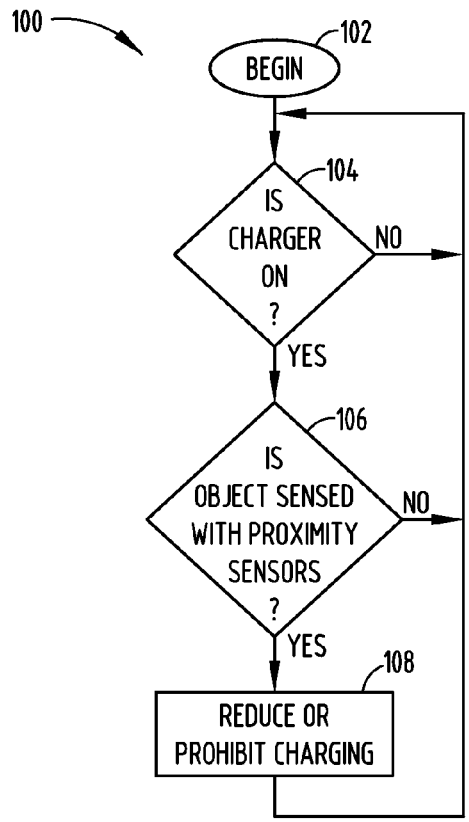
FIG. 5 is a flowchart illustrating a routine for controlling the inductive charging to reduce electromagnetic field exposure to an occupant, according to one embodiment.

The protection routine 100 is illustrated in FIG. 5, according to one embodiment. Routine 100 begins at step 102 and proceeds to decision step 104 to determine if the wireless charger is on and, if not, returns to step 104. If the wireless charger is determined to be on, routine 100 proceeds to decision step 106 to determine if an object has been sensed in close proximity to the charger region with the proximity sensor(s). By close proximity, the sensed object may be located in the charger region or sufficiently close to the charger region such as within 12 centimeters. If no object is sensed in close proximity to the charger region, routine 100 returns to step 104. If an object is sensed in close proximity to the charger region with the proximity sensor(s), routine 100 proceeds to step 108 to reduce or prohibit charging of a device within the charger region. It should be appreciated that the wireless charging continues when the object is no longer determined to be in close proximity to the charger region. Accordingly, the strength of the electromagnetic field within the charger region is reduced or eliminated while an object is sensed in close proximity to the charger region.

Accordingly, the wireless charging system advantageously reduces or prohibits an electric signal in the form of an electromagnetic field within the charger region when an object, such as body part of a person, is detected in close proximity to the charger region. This advantageously prevents the electromagnetic field from penetrating into the body of a person. The wireless charging system is particularly well suited for use on a vehicle where users typically stow personal electronic devices within reach. However, the system may be useful for other applications. It should be appreciated that when the object is no longer sensed with the proximity sensor, the wireless charging may be increased and resumed.

Figure 6:
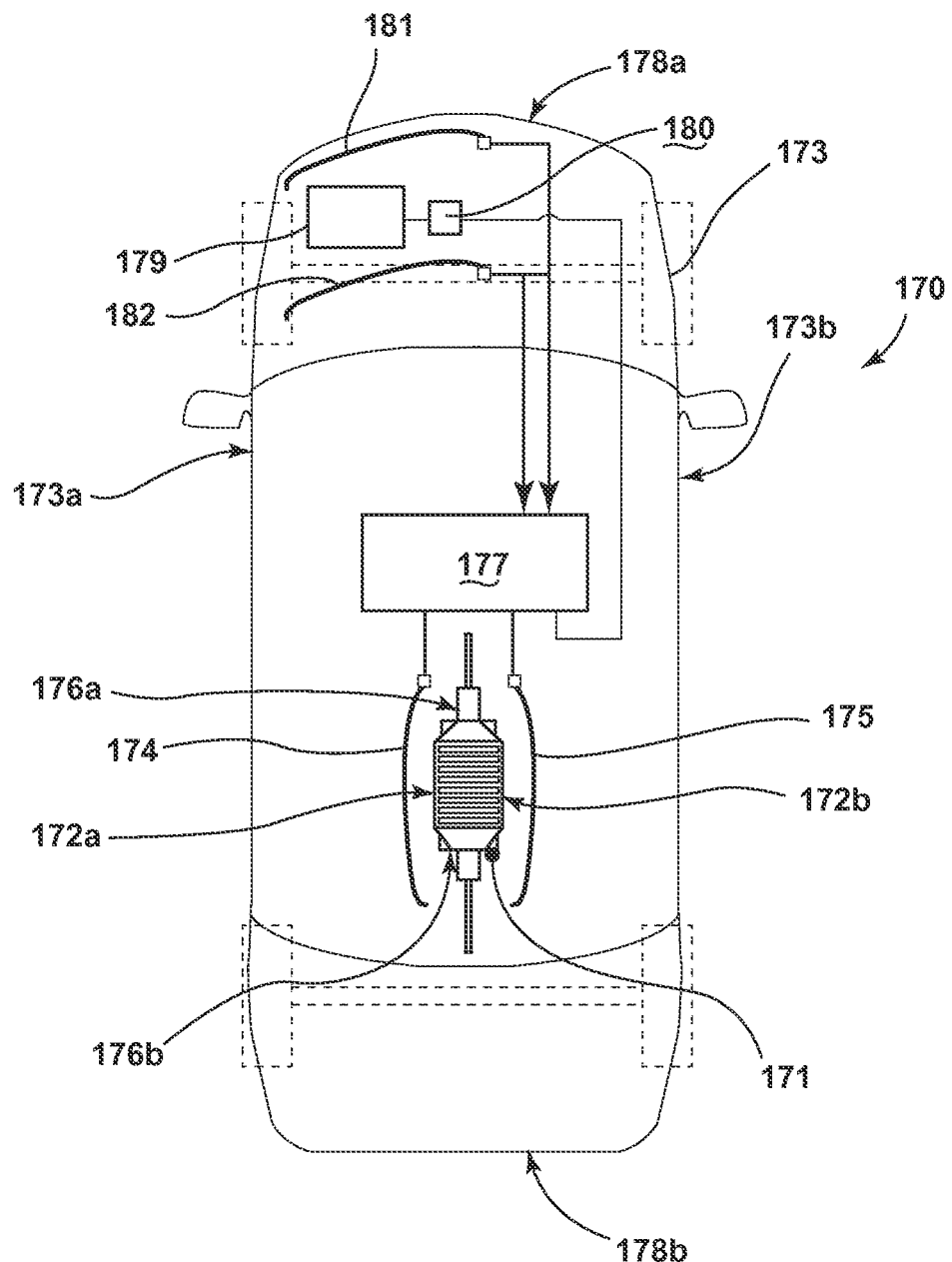
FIG. 6 is a plan view schematic of a proximity-based catalytic converter protection system according to an additional embodiment.

According to an additional embodiment shown in FIG. 6, a proximity-based catalytic converter protection system 170 may be employed to protect the integrity of a catalytic converter 171 in a vehicle 173. System 170 includes a pair of electrodes 174 and 175, both electrically coupled to controller 177. As shown, catalytic converter 171 includes a left side 172a, right side 172b, front portion 176a, and rear portion 176b. Similarly, vehicle 173 includes a left side 173a, right side 173b, front portion 178a, and rear portion 178b.

Electrodes 174 and 175 are located in proximity to the left side 172a and right side 172b, respectively, of catalytic converter 171 (see FIG. 6). Electrodes 174 and 175 may be fabricated from materials in order to optimize the detection of changes in capacitance between them. Electrodes 174 and 175 may also be located in proximity to the front portion 176a and rear portion 176b of catalytic converter 171. Further, electrodes 174 and 175 can be located in other orientations provided that they are in proximity to two opposed sides or surfaces of catalytic converter 171 (e.g., front and rear portions 176a and 176b, respectively).

Controller 177 is configured within protection system 170 to monitor the capacitance between electrodes 174 and 175 to detect movement of objects external to vehicle 173 and in proximity to converter 171. Movement of objects, animals and/or individuals in proximity to the catalytic converter 171 will cause changes in the capacitance measured between electrodes 174 and 175 relative to a baseline threshold value. Using this data, controller 177 can assess whether unauthorized individuals and/or objects used by unauthorized individuals remain in the presence of catalytic converter 171. One advantage of system 170 is that it can detect the presence of an unauthorized individual in proximity to the converter 171 before he or she tampers with or otherwise attempts to remove the catalytic converter 171.

Protection system 170 may employ controller 177 to alert an unauthorized individual in proximity to the converter 171 before that person has damaged the vehicle 173 and/or the converter 171. Optionally, controller 177 may be electrically coupled to an alarm element 180 to activate an alarm that signals the unauthorized individual or others in the immediate vicinity of vehicle 173. Alarm element 180 may also be used to signal others in remote locations, including the vehicle owner, of the presence of such unauthorized individuals and/or objects in proximity to the converter 171. Alarm element 180 may be configured as an audible device (e.g., horn) or a visual device (e.g., flashing or strobe lights). Alarm element 180 may also be configured comparable to known vehicular anti-theft signaling components and schemes (e.g., an alternating sequence of headlight, tail-light and other signal light flashing followed by a sequence of audible horn signals). Alarm element 180 may also include wireless transmitter devices that notify governmental authorities, the vehicle owner and/or other responsible parties (e.g., a commercial anti-theft service) upon the measurement of an improper resistance level by controller 177. When wireless devices are incorporated into alarm element 180, system 170 may also be configured to be silent and without visual indication at the vehicle in order to improve the chances of apprehending a converter thief or vandal in action. Alarm element 180 may even include camera devices (not shown) mounted in proximity to the catalytic converter 171 to obtain photographic evidence of the would-be thief and/or other unauthorized individuals. Further, alarm element 180 may be configured as a variable-output type alarm component capable of generating a plurality of alarm signals. For instance, alarm element 180 may be a vehicle horn capable of producing variable decibel levels, or a signal light capable of producing variable light intensity levels.

By measuring the capacitance between electrodes 174 and 175, controller 177 may detect the presence of unauthorized individuals (e.g., would-be catalytic converter thieves), animals, or objects (e.g., equipment to be used for theft and/or tampering of the catalytic converter) in proximity to the catalytic converter 171. In one detection approach, controller 177 may compare the measured capacitance between electrodes 174 and 175 to a predetermined capacitance threshold value. The threshold capacitance value is based on the measured capacitance between electrodes 174 and 175 in a normal operating state with no unauthorized individuals, animals, or objects between the electrodes. Accordingly, a capacitance level detected by controller 177 that exceeds the threshold may be indicative of the presence of an unauthorized person, animal, or object. Controller 177 may then sound an alarm via alarm element 180 upon measuring a capacitance level above this threshold.

In another approach, controller 177 is configured to filter out false positive readings from transient responses that are not indicative of the presence of an unauthorized individual or object in proximity to the converter 171. For example, the presence of cats, dogs, rodents, sticks or grass that move under the vehicle 173 from the wind, and other such effects can produce changes in the capacitance level between electrodes 174 and 175 measured by controller 177. Since these situations are frequently of a short duration and/or create changes in capacitance levels below those caused by the presence of unauthorized individuals and/or objects, it is possible for controller 177 to filter them. For example, empirical capacitance data can be generated indicative of the presence of unauthorized individuals and objects, along with data associated with the above transient responses. Predetermined thresholds for capacitance amplitude and duration can be programmed into controller 177 based on these empirical data to allow controller 177 to filter out these transient responses.

Similarly, weather conditions (e.g., accumulation of snow, ice, dirt, etc.) can cause small changes to the capacitance measured between electrodes 174 and 175 over a relatively long period time. Accordingly, these changes may exceed a given upper threshold (e.g., based on prior-developed empirical data) over a long period of time, but are different in character than the abrupt changes over a short period of time caused by the presence of unauthorized individuals and/or objects in proximity to converter 171. In one such detection scheme, for example, controller 177 will only cause the activation of an alarm element 180 upon detecting a change in capacitance between electrodes 174 and 175 that exceeds a predetermined capacitance threshold over a predetermined time period. Using these two threshold values, protection system 170 can employ controller 177 to filter out false positive readings generated over a longer period of time as drift, not indicative of the presence of unauthorized individuals and/or objects.

According to another detection scheme, controller 177 may activate alarm element 180 to a first output level upon the detection of a change in the capacitance between electrodes 174 and 175 that exceeds a first predetermined threshold over a first predetermined time period. This first alarm level may be comparable to a warning indication. That warning indication may be used to spur rodents, pets and other animals to move away from the catalytic converter 171. In some instances, the warning indication could also spur unauthorized individuals that may have only partially entered the detection zone between electrodes 174 and 175 to move away from the vehicle. However, at this point, the protection system 170 is more likely to be faced with the need to assess whether the measured capacitance level between electrodes 174 and 175 is actually caused by an unauthorized individual, animal, or object. Accordingly, the detection scheme calls for controller 177 to activate alarm element 180 to a second, full-alarm level upon the detection of a change in the capacitance level between electrodes 174 and 175 that exceeds a second predetermined threshold over a second predetermined time period. Various schemes can be employed to tune out false positives from transient conditions (e.g., rodents) that are not indicative of the presence of unauthorized individuals or objects in proximity to catalytic converter 171. It should be understood that the detection scheme used by controller 177 may employ various threshold capacitance levels, threshold durations for such changes, and multiple levels of such thresholds to effectively distinguish between the presence of unauthorized individuals and objects in proximity to the converter 171, and false positives from other transient conditions. Such schemes can be developed by routine experimentation to assess the changes in capacitance observed between electrodes 174 and 175 caused by various likely transient conditions not indicative of the presence of unauthorized individuals and objects in proximity to the catalytic converter 171.

As also depicted in FIG. 6, protection system 170 optionally may employ a subsystem to protect a power source 179 electrically coupled to controller 177 and alarm element 180. In particular, system 170 may include electrodes 181 and 182 that are located in proximity to the power source 179. These electrodes 181 and 182 can be arranged in proximity to two opposing sides of the power source 179, analogous to the electrodes 174 and 175 arranged in proximity to the left and right sides 172a and 172b (or front and rear portions 176a and 176b) of catalytic converter 171. When system 170 is arranged with electrodes 181 and 182 in proximity to power source 179, controller 177 may also monitor the capacitance changes between electrodes 181 and 182 to detect movement of unauthorized individuals and objects in proximity to the power source 179. The schemes described earlier to disregard false positives and detect such unauthorized individuals and objects in connection with catalytic converter 171 can be similarly employed for the detection of such individuals and objects near the power source 179. Further, the alarm element 180 (e.g., a horn, siren, or other alarm device) can be located inside the detection zone of electrodes 181 and 182, or inside the zone formed by electrodes 174 and 175. This provides protection against tampering with alarm element 180.

Figure 7:
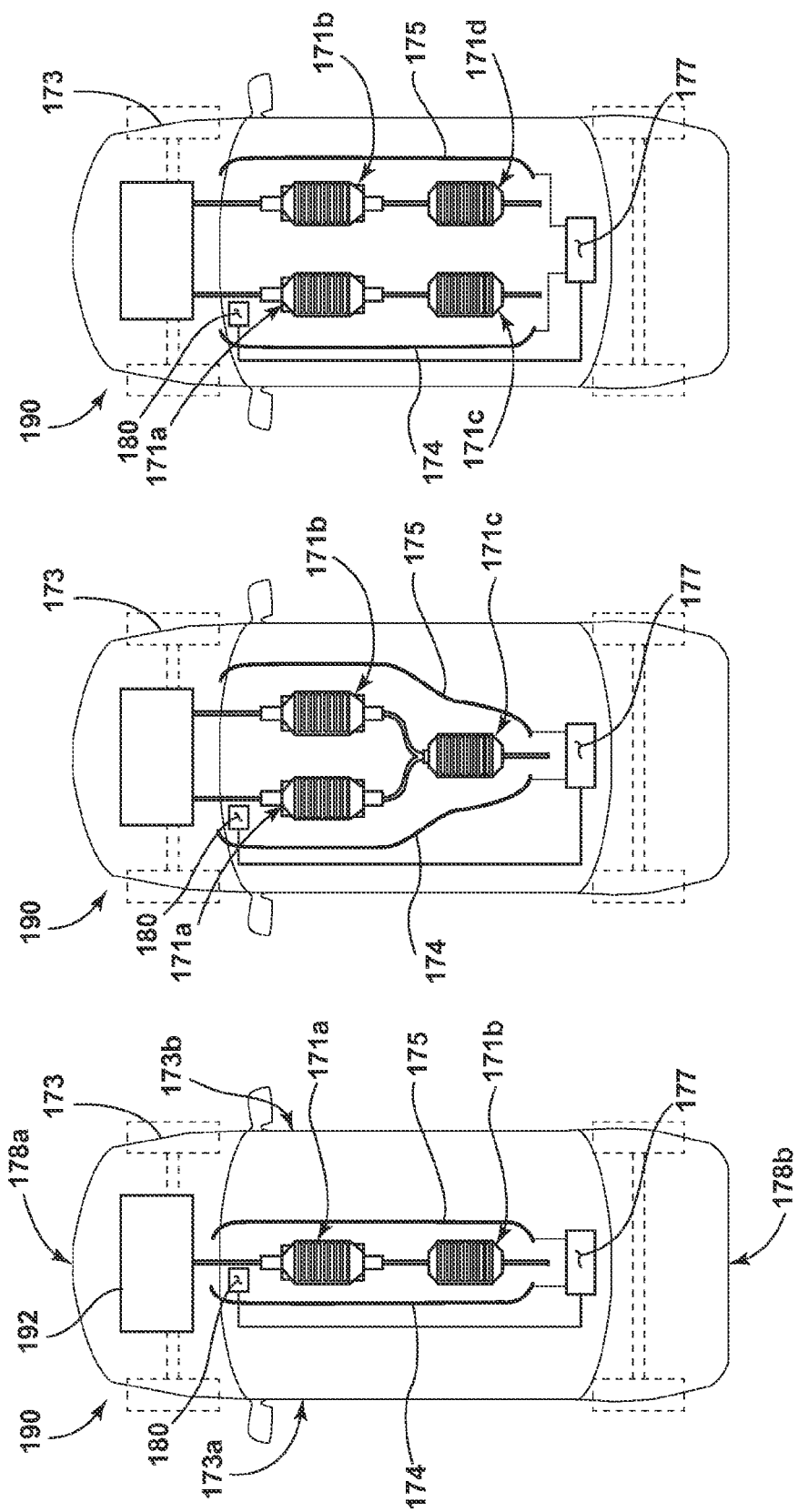
FIG. 7A is a plan view schematic of a proximity-based catalytic converter protection system for use with two catalytic converters according to another embodiment.
FIG. 7B is a plan view schematic of a proximity-based catalytic converter protection system for use with three catalytic converters according to a further embodiment.
FIG. 7C is a plan view schematic of a proximity-based catalytic converter protection system for use with four catalytic converters according to an additional embodiment.

According to other embodiments shown in FIGS. 7A-7C, proximity-based catalytic converter protection system 190 can be employed to detect the presence of unauthorized individuals and objects in proximity to a plurality of catalytic converters (i.e., converters 171a, 171b, 171c, 171d, etc.) located in a given vehicle 173 and arranged in connection to the exhaust system (not shown) of engine 192. The components and detection schemes employed by system 190 depicted in FIGS. 7A-7C are nearly identical to those employed by protection system 170 (see FIG. 6). For example, a pair of electrodes 174 and 175 are utilized by controller 177 to detect changes in capacitance associated with the presence of unauthorized individuals and objects in proximity to one or more of the plurality of converters 171a, 171b, 171c and 171d. The broad coverage provided by electrodes 174 and 175 used in proximity-based protection system 190 can provide cost savings over resistance-based systems (see U.S. patent application Ser. No. 13/726,441, incorporated by reference herein) used in vehicles with a plurality of catalytic converters. This is because the resistance-based systems generally require multiple resistor elements and monitoring circuits for each catalytic converter.

In system 190, the electrodes 174 and 175 may be located along left and right sides of the vehicle 173a and 173b, respectively. Further, electrode 174 may be located in proximity to the left side of the left-most converters 171a and 171c in vehicle 173 (see, e.g., FIG. 7C). Similarly, electrode 175 may be located in proximity to the right side of the right-most converters 171b and 171d in vehicle 173 (see, e.g., FIG. 7C). In general, the goal is to employ electrodes 174 and 175 such that they define an area between them that effectively covers the plurality of catalytic converters 171a, 171b, 171c and 171d. For example, electrodes 174 and 175 may also be located near the front and rear portions 178a and 178b of the vehicle 173 to straddle the plurality of converters 171a, 171b, 171c and 171d. Consequently, protection system 190 can employ electrodes 174 and 175 to detect capacitance changes associated with movement in proximity to any of the plurality of converters 171a, 171b, 171c and/or 171d employed in vehicle 173. Further, the alarm element 180 can be located in the detection zone of electrodes 174 and 175 to provide protection against tampering with alarm element 180.

Figure 8:
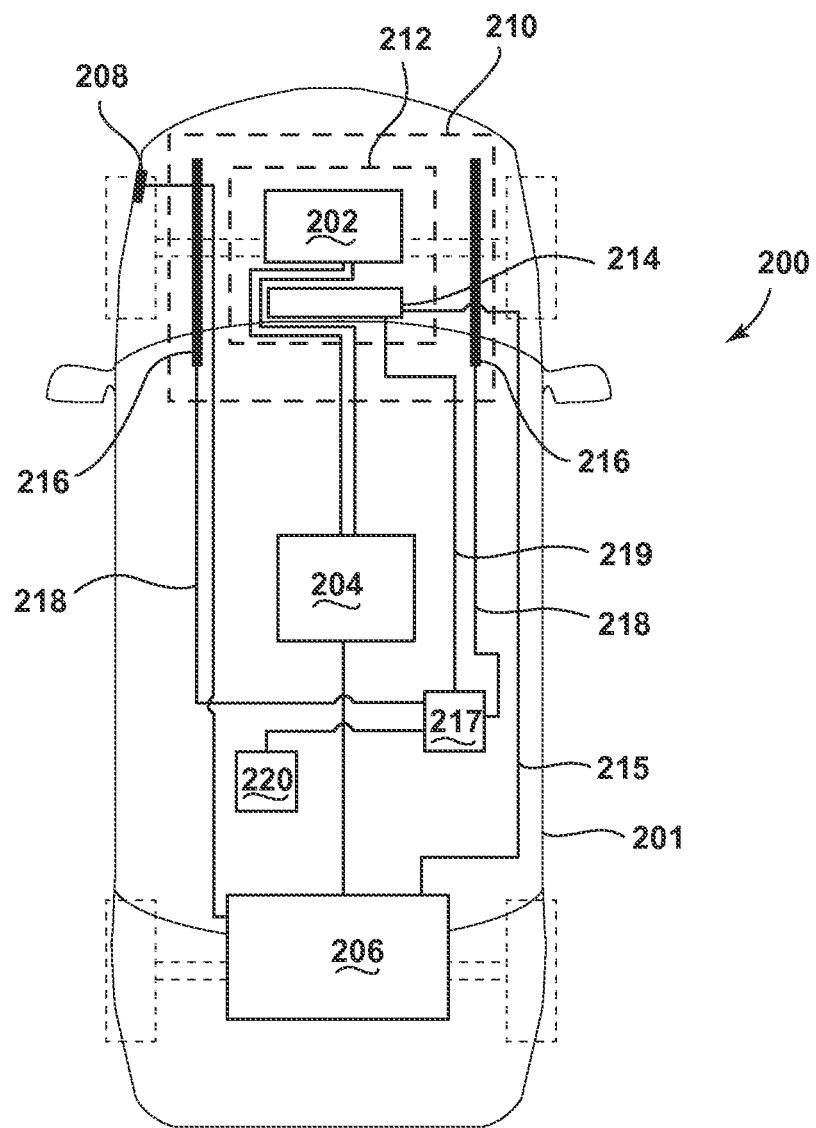
FIG. 8 is a plan view schematic of a charger safety system for use with a battery electric vehicle according to another embodiment.
Figure 8A:
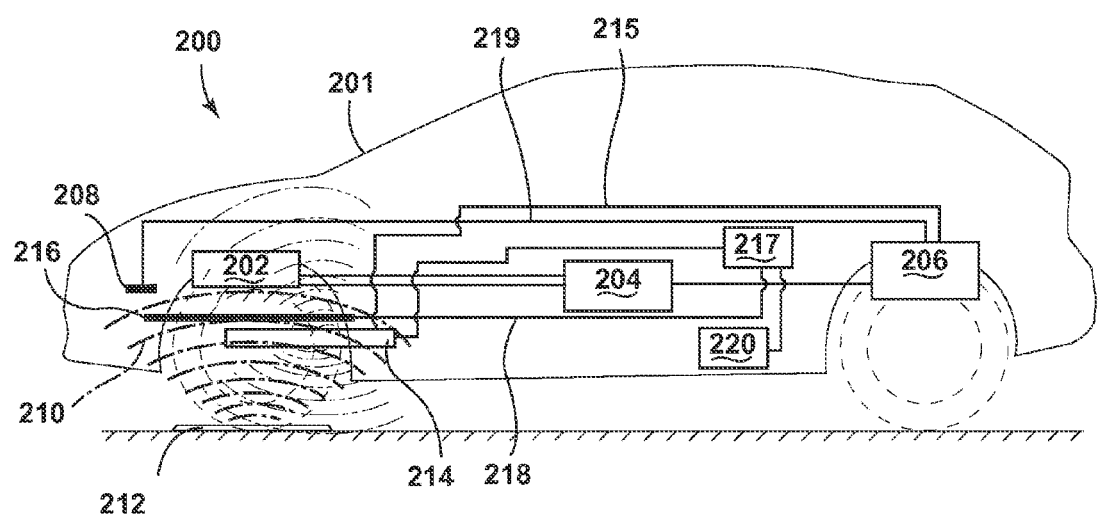
FIG. 8A is a side view schematic of the charger safety system depicted in FIG. 8.

According to an additional embodiment shown in FIGS. 8 and 8A, a charger safety system 200 may be employed to minimize EMF exposure to foreign objects and living beings in the vicinity of battery-powered electric vehicle 201 produced during charging of its batteries 206. As shown, vehicle 201 may include a regenerative braking assembly 202 coupled to an electric motor 204. Batteries 206 are configured within vehicle 201 to power electric motor 204. Further, vehicle 201 may be any vehicle with an electric propulsion aspect having a battery 206. Batteries 206 are typically comprised of a set of rechargeable batteries arranged to power vehicle 201. Further, a charger port 208 can be used to charge batteries 206 via a wired, external connection (e.g., an external 120V or 220V charging plug) to vehicle 201.

System 200 includes batteries 206, a charger region 210 and a wireless charger receiver 214. The wireless charger receiver 214 collects and rectifies electrical signals (e.g., EMF that may or may not carry information) in the charger region 210 generated by a wireless charger station (off-board) 212 to order to charge batteries 206. As such, charger receiver 214 provides an alternative approach to charging batteries 206 for operation of vehicle 201. Charger receiver 214 may be coupled to batteries 206 via wiring 215. A wireless charger station 212 beneath vehicle 201 may be employed to generate EMF and/or other electric signals in charger receiver 214 through induction, for example. The EMF generated by wireless charger station 212 and any additional EMF and/or other electric signals generated by charger receiver 214 may define a charger region 210 as illustrated in FIGS. 8 and 8A. Depending on the shape of the coils within charger station 212 and receiver 214, the charger region 210 may be defined in a rectangular, oval, circular or other comparable shape. This charger region 210 is in the vicinity of the charger receiver 214 and station 212. Foreign objects (e.g., metal tools, coins, and other ferrous and non-ferrous objects, including objects susceptible to EMF exposure) and living beings (e.g., pedestrians, vehicle occupants, individuals in proximity to vehicle 201, animals, and pets) in the presence of charger region 210 during operation of charger receiver 214 and station 212 may be exposed to various EMF levels.

Charger safety system 200 further includes a pair of sensors 216, arranged in proximity to the charger region 210. Sensors 216 are located to sense the presence of foreign objects and living beings in proximity to the charger region 210. As shown in FIGS. 8 and 8A, one sensor 216 is placed on the left-hand side of vehicle 201 and another sensor 216 is placed on the right-hand side of vehicle 201, both sensors 216 located in close proximity to the outer boundaries of charger region 210. It should be understood that sensors 216 can be placed at other locations within or on the vehicle 201 for the purpose of sensing the presence of foreign objects and living beings in proximity to charger region 210. It should also be apparent that any number of sensors 216 and placement configurations can be employed in proximity to charger region 210 depending on the types of sensors utilized in system 200, desired sensitivity, charger coil shapes within wireless charger station 212, and other factors associated with vehicle design such as cost, fuel efficiency, and space constraints. It should also be understood that sensors used in vehicle 201 for other purposes (e.g., proximity sensors configured to activate a lift gate) may also be employed within system 200 to serve as sensors 216.

Sensors 216 may also contain a microprocessor (not shown) that can evaluate capacitance levels measured between the sensors, for example. These capacitance levels change as a function of the presence of foreign objects and living beings in proximity to the charger region 210. Other data provided by sensors 216 (depending on the type of sensor employed for sensors 216) can also be employed to sense the presence of these objects and beings. For example, sensors 216 can employ infrared, heat, vibration, and other types of proximity sensors for this purpose. The sensors 216 can thus be configured to determine the presence of the foreign objects and living beings in the immediate vicinity of charger region 210.

The charger safety system 200 also includes a controller 217. The controller can be coupled to sensors 216 by sensor wiring 218. Controller 217 can also be coupled to charger receiver 214 by control wiring 219. Controller 217 can be configured to control charger receiver 214 via control wiring 219 based at least on data provided to it by sensors 216 via sensor wiring 218. As such, controller 217 can rely directly on data and evaluations provided by sensors 216. Alternatively, controller 217 may contain microprocessors (not shown) and other related components, arranged to evaluate the presence of foreign objects and living beings in proximity to charger region 210 based at least in part on data received from sensors 216. Controller 217 can then control charger receiver 214 to at least reduce the electrical signal in charger region 210 when a foreign object or living being is in proximity to the charger region 210. Controller 217 may also terminate this electrical signal in charger region 210 in response to the presence of these objects and/or living beings. Controller 217 may also provide instructions for charger station 212 to reduce or terminate transmitter power via low-frequency (LF) or radio-frequency (RF) communication between the transmitter within charger station 212 and the receiver coils within charger receiver 214. In other configurations, controller 217 could effect termination or reduction of transmitter power within the charger station 212 by utilizing the remote entry system of vehicle 201 (not shown) to transmit such instructions, a telematics communication means (not shown), or other wireless means. As such, controller 217 can be utilized to minimize or eliminate EMF exposure to such objects and beings for enhanced safety.

As also shown in FIGS. 8 and 8A, the controller 217 employed in charger safety system 200 can be coupled to an alarm element 220. Upon detection of a foreign object or a living being in proximity to charger region 210, controller 217 can activate the alarm element 220 to signal the presence of such objects and/or beings. For example, alarm element 220 can be a horn, siren, visual indicator or other signaling element. When activated, alarm element 220 can deter living beings from moving or remaining in proximity to charger region 210 during operation of charger station 212 and charger receiver 214. Alarm element 220 can also serve to deter individuals from placing foreign objects in proximity to charger region 210 as a matter of safety. For example, a metal tool placed in proximity to charger region 210 during operation of charger station 212 and charger receiver 214 can be subjected to significant energy from the EMF generated from the wireless charging action associated with charging batteries 206 in vehicle 201. Such energy may cause the metal tool to heat up, presenting a safety hazard for individuals in proximity to vehicle 201.

Further, controller 217 may be programmed to deactivate alarm element 220 after a predetermined period of time if the foreign object has not been removed from proximity to charger region 210 (e.g., a beverage can in proximity to charger region 210). Such actions by controller 217 to deactivate the alarm element 220 can conserve the charge in and/or life of batteries 206. In addition, controller 217 can wirelessly notify the owner, for example, of vehicle 201 if it has reduced or eliminated the charging signals in charger region 210 through telematics, Wi-Fi, Bluetooth, two-way remote-entry or other wireless means. Controller 217 can then notify this individual of the increased charge times associated with its termination or reduction of the electric signals in charger region 210.

Figure 9:
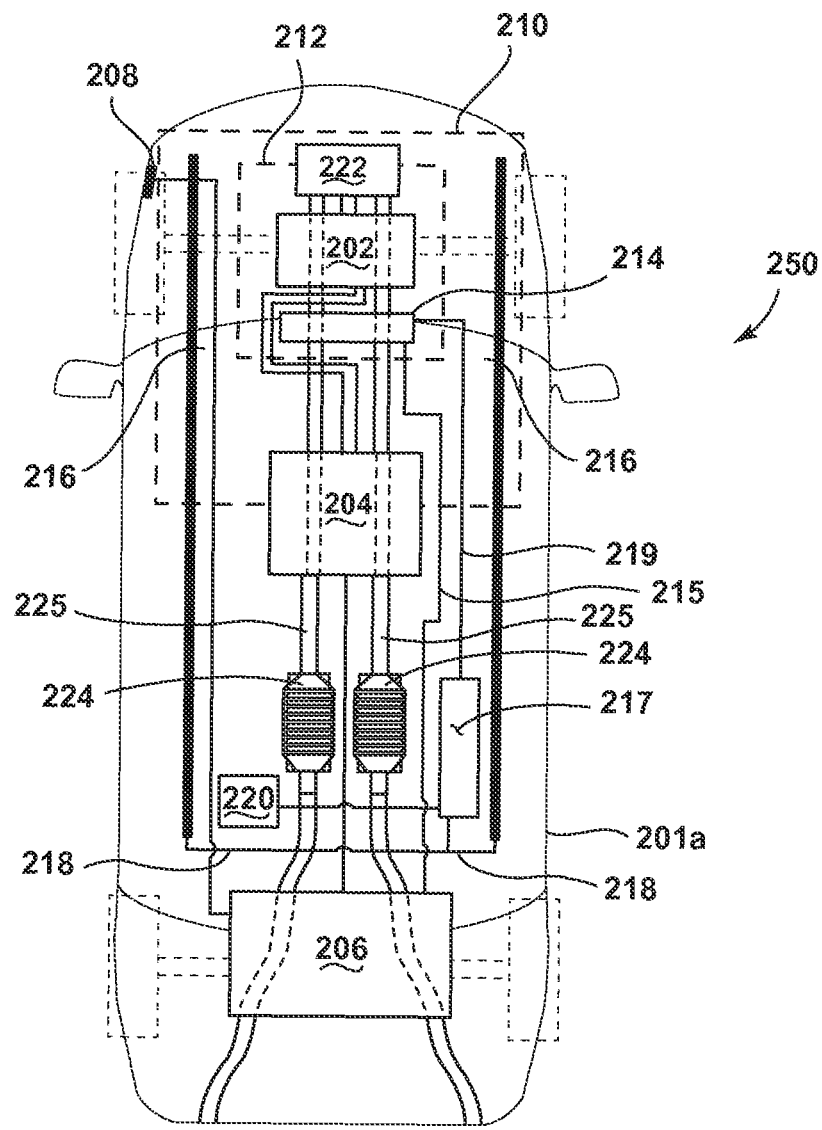
FIG. 9 is a plan view schematic of a combined charger safety and protection system for use with a plug-in hybrid electric vehicle according to a further embodiment.

Referring to FIG. 9, a combined vehicle safety and protection system 250 is depicted according to a further embodiment. Combined system 250 may be employed to minimize EMF exposure to foreign objects and living beings in the vicinity of a plug-in hybrid vehicle battery-powered electric vehicle 201a. Such EMF can be generated in the charger region 210 during the charging of batteries 206 in vehicle 201a. Vehicle 201a includes a regenerative braking assembly 202 coupled to an electric motor 204. Batteries 206 are configured within vehicle 201a to provide power to electric motor 204. Further, a charger port 208 can be used to charge batteries 206 via a wired, external connection (e.g., an external 120V or 220V charging plug) to vehicle 201a (not shown).

As depicted in FIG. 9, combined vehicle safety and protection system 250 operates in a similar fashion as safety system 200 (see FIGS. 8, 8A) to minimize or eliminate EMF exposure to foreign objects and living beings in proximity to the charger region 210 of vehicle 201a. Unless otherwise noted, the like-numbered components of combined safety system 250 depicted in FIG. 9 and the safety system 200 depicted in FIGS. 8, 8A are configured comparably to one another and operate in the same manner. For example, the sensors 216 of system 250 can be located to sense the presence of foreign objects and living beings in proximity to the charger region 210 of vehicle 201a.

In addition, vehicle 201a includes an internal combustion engine 222 and may be coupled to the regenerative braking assembly 202 as shown in FIG. 9. Internal combustion engine 222 is further connected to an exhaust system 225 that includes catalytic converter elements 224. Note that some vehicle 201a configurations have one catalytic converter element 224 or more than two catalytic converter elements 224. Further, the sensors 216 can be extended in the rearward direction within vehicle 201a in proximity to catalytic converter elements 224 (see FIG. 9). Sensors 216 may also be configured to more closely follow the particular contours of the charger safety (e.g., system 200 depicted in FIGS. 8, 8A) and combined safety systems (e.g., system 250 comprising converter elements 224) within vehicles 201, 201a. Consequently, the combined safety and protection system 250 can also be employed to deter or prevent theft and tampering with catalytic converter elements 224. When used in this manner, combined system 250 relies on sensors 216 to detect the presence of unauthorized individuals or objects in proximity to catalytic converter elements 224. The controller 217 can also utilize data from sensors 216 to evaluate the presence of such objects and beings, and activate alarm element 220 in response to such conditions. The techniques and approaches described earlier in connection with systems 170 (see FIG. 6) and 190 (see FIGS. 7A-7C) can also be utilized by the combined safety and protection system 250 depicted in FIG. 9.

As shown in FIG. 9, one sensor 216 is placed on the left-hand side of vehicle 201a and another sensor 216 is placed on the right-hand side of vehicle 201a, both sensors 216 located in close proximity to the outer boundaries of charger region 210. Further, the sensors 216 are placed in proximity to the catalytic converter elements 224. It should be understood, however, that sensors 216 can be placed at other locations within or on the vehicle 201a for the purpose of sensing the presence of foreign objects and living beings in proximity to charger region 210 and catalytic converter elements 224. It should also be apparent that any number of sensors 216 can be employed in proximity to charger region 210 and/or catalytic converter elements 224 depending on the types of sensors utilized in system 250, the desired sensitivity and other factors associated with the design of vehicle 201a (e.g., cost, fuel efficiency, space constraints, etc.).

Figure 10A:
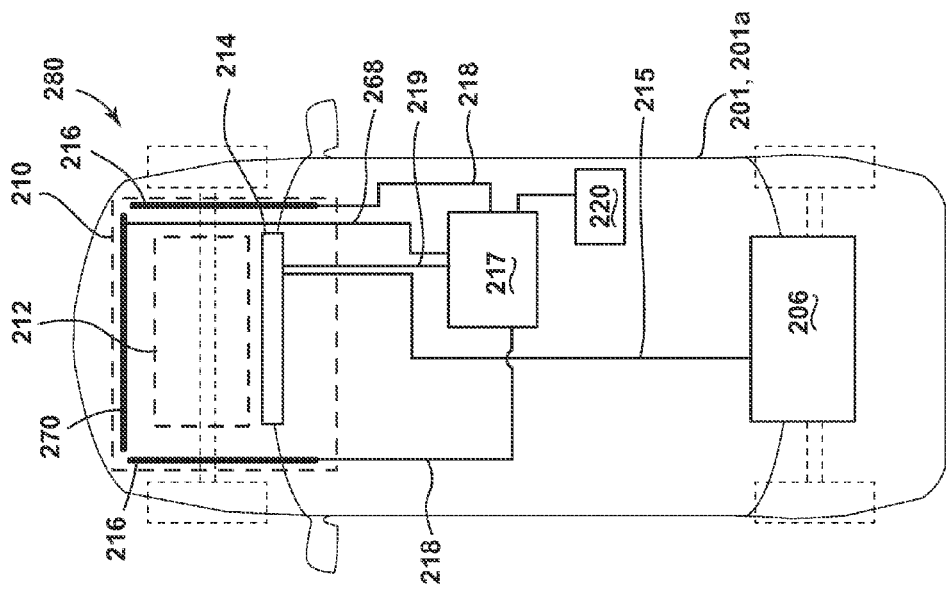
FIG. 10A is a plan view schematic of a safety system with a ring sensor arrangement according to an additional embodiment.

Referring to FIG. 10A, a safety system 260 that utilizes a pair of ring sensors 256a, 256b is depicted according to another embodiment. Unless otherwise noted, safety system 260 operates in the same manner and utilizes the same like-numbered components as system 200 (see FIGS. 8, 8A). In system 260, however, sensors 216 are replaced by an inner ring sensor 256a and outer ring sensor 256b, both configured in proximity to the charger region 210 and coupled to controller 217. The sensors 256a and 256b used in safety system 260 can more effectively detect the presence of foreign objects and living beings in proximity to charger region 210 in comparison to the sensors 216 utilized by systems 200 and 250 (see FIGS. 8, 8A and 9). On the other hand, sensors 256a and 256b depicted in FIG. 10A have more surface area than sensors 216, thus requiring more space and having more weight—attributes less desirable for certain vehicle applications. In addition, when sensors 256a and 256b are employed in a safety system 260 comparable to combined system 250 (see FIG. 9), they alone cannot serve the combined purpose of sensing the presence of foreign objects and living beings in proximity to both the charger region 210 and catalytic converters 224 (see FIG. 9). Another set of sensors 256a and 256b (or comparable sensors) would need to be placed in proximity to the catalytic converters 224 and coupled to controller 217 to serve this purpose.

It should therefore be apparent that various sensors 216, 256a, 256b and others may be utilized in systems 200, 250 and 260 (see FIGS. 8, 8A, 9 and 10A) to detect the presence of foreign objects and living beings in proximity to the charger region 210, catalytic converter elements 224 and/or other vehicular components based on their arrangement within vehicles 201, 201a. Various quantities and placements of sensors 216, 256a, 256b within vehicles 201, 201a can be used for these functions. Further, additional quantities and sizes of sensors comparable to sensors 216, 256a and 256b may be placed within vehicles 201, 201a to provide even more coverage of charger region 210 and added sensitivity. Space and weight constraints within the vehicle 201, 201a associated with sensors 216, 256a, 256b and the like can be balanced by the need for precise detection of foreign objects and living beings in proximity to charger region 210, catalytic converter elements 224 and other vehicular components, as desired.

Figure 10B:
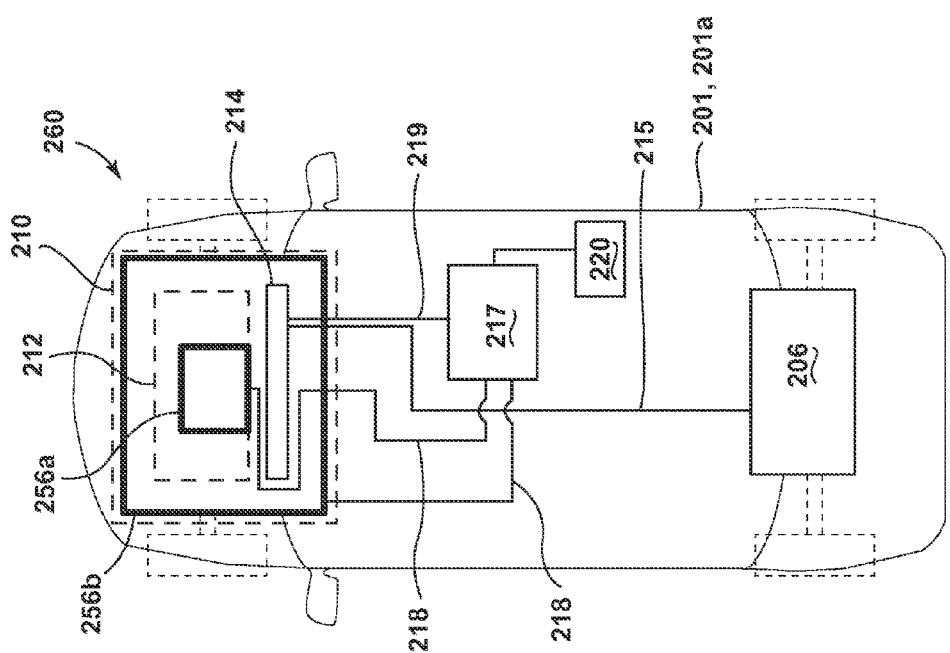
FIG. 10B is a plan view schematic of a safety system with a reference sensor according to another embodiment.

FIG. 10B depicts a charger safety system 280 configured to filter out transient conditions unrelated to the presence of foreign objects and living beings in proximity to charger region 210 according to a further embodiment. As shown, safety system 280 can be utilized in vehicle 201 comparably to system 200 depicted in FIG. 8. In particular, safety system 280 includes sensors 216 configured in a similar fashion as the sensors 216 shown in connection with system 200 (see FIG. 8). System 280, however, also includes a reference sensor 270 coupled to controller 217 via reference sensor wiring 268. It should be understood that system 280 (including reference sensor 270) may also be utilized in a vehicle 201a employing a system comparable to the combined system 250 depicted in FIG. 9 with sensors 216 in proximity to a charger region 210 and catalytic converters 224.

Safety system 280 can rely on data provided by reference sensor 270 and sensors 216 to filter transient conditions unrelated to the presence of foreign objects and living beings in proximity to the charger region 210 and/or catalytic converter elements 224 (see FIG. 9). In particular, controller 217 may rely on the combined data provided by reference sensor 270 and sensors 216 for this purpose. Vehicles 201, 201a, for example, may move from wind gusts (e.g., the vehicle may pitch in a clockwise or counter-clockwise direction around its long axis) causing slight changes in data sensed by sensors 216 (e.g., capacitance levels).

For example, the movement of vehicles 201, 201a caused by the wind gusts can slightly change the distance between sensors 216, thus causing a change in capacitance levels measured by the sensors 216. Controller 217, however, can rely on additional data provided by reference sensor 270 to filter out such transient conditions. It is possible that the movement of the vehicles 201, 201a caused by the wind gusts will change the capacitance levels measured between sensors 216, while having less effect on the capacitance measured between reference sensor 270 and one of the sensors 216. Other transient conditions that can be filtered by system 280 (or another safety and protection system employing the concepts of system 280) include the movement of sticks, debris, garbage and other objects in proximity to charger region 210 not likely susceptible to EMF exposure and/or irrelevant to the protection of particular vehicle components (e.g., catalytic converter elements 224 depicted in FIG. 9).

By utilizing algorithms and predetermined relationships associated with particular geometries of the vehicle 201, 201*a*, reference sensor 270 and sensors 216, the controller 217 can differentiate between transient conditions and the presence of foreign objects and living beings in proximity to charger region 210 and/or catalytic converters 224. Still further, predetermined relationships and algorithms as a function of time can be programmed into controller 217 to account for other known transient conditions unrelated to the foreign objects and living beings targeted by system 280. The system 280 and controller 217, for example, could be configured to protect pets (e.g., dogs and cats) from EMF exposure, while not reacting to motion or presence of insects in proximity to charger region 210. Such programming of controller 217 could be based on a prior understanding of the different signals measured by reference sensor 270 and sensors 216 in response to the presence of pets, insects and other objects likely to come into the presence of charger region 210.

Variations and modifications can be made to the aforementioned structure without departing from the concepts of the present invention. Further, such concepts are intended to be covered by the following claims unless these claims by their language expressly state otherwise.

What is claimed is:

1. A charging system for a vehicular battery, comprising:
   an on-board wireless receiver for collecting a charging signal from an off-board charger to charge the battery;
   a charger region produced by the receiver and charger;
   a plurality of sensors located to sense living beings and foreign objects near the charger region: and
   a controller for differentiating between the beings, objects and transient conditions comprising motion of a vehicle comprising the receiver to terminate the charging signal.

2. The charging system of claim 1, wherein the controller is further configured to activate an alarm component when a living being or a foreign object is in proximity to the charger region.

3. The charging system of claim 1, wherein the plurality of sensors generate capacitance data to sense living beings and foreign objects in proximity to the charger region.

4. The charging system of claim 1, wherein the plurality of sensors is coupled to the controller, and further wherein the controller evaluates the presence of living beings and foreign objects in proximity to the charger region based at least in part on input data from the sensors.

5. The charging system of claim 4, wherein the plurality of sensors comprises a reference sensor.

6. The charging system of claim 1, wherein the transient conditions further comprise objects not susceptible to EMF associated with the charging signal in the charger region.

7. A vehicular protection system, comprising:
   a vehicular battery;
   a catalytic converter;
   an on-board, wireless receiver that collects a charging signal from an off-board charger to charge the battery;
   a plurality of sensors located to sense living beings near the converter and a charger region defined by the receiver and charger and unrelated transient conditions comprising motion of a vehicle comprising the receiver; and
   a controller coupled to the sensors for differentiating between the transient conditions and living beings, terminating the charging signal when a being is near the charger region and activating an alarm when a being is near the converter.

8. The protection system of claim 7, wherein the controller is further configured to activate the alarm when a living being is in proximity to the charger region.

9. The protection system of claim 7, wherein the plurality of sensors generate capacitance data to sense living beings near the charger region and the catalytic converter.

10. The protection system of claim 7, wherein the controller evaluates the presence of living beings near the charger region and the catalytic converter based at least in part on input data from the sensors.

11. The protection system of claim 10, wherein the plurality of sensors comprises a reference sensor.

12. A charging system for a vehicle, comprising:
    a vehicular battery;
    an on-board wireless receiver that collects a charging signal from an off-board charger to charge the battery;
    a charger region produced by the receiver and charger; and
    an on-board controller coupled to a plurality of sensors that wirelessly terminates the charging signal from the charger upon detecting living beings and foreign objects near the charger region and differentiates unrelated transient conditions comprising motion of a vehicle comprising the receiver.

13. The charging system of claim 12, wherein the controller is further configured to activate an alarm component when a living being or a foreign object is in proximity to the charger region.

14. The charging system of claim 12, wherein the plurality of sensors generate capacitance data to sense living beings and foreign objects in proximity to the charger region.

15. The charging system of claim 12, wherein the controller evaluates the presence of living beings and foreign objects in proximity to the charger region based at least in part on input data from the sensors.

16. The charging system of claim 15, wherein the plurality of sensors comprises a reference sensor.

17. The charging system of claim 12, wherein the transient conditions further comprise objects not susceptible to EMF associated with the charging signal in the charger region.

* * * * *